(12) United States Patent
Haraguchi et al.

(10) Patent No.: US 6,813,146 B2
(45) Date of Patent: Nov. 2, 2004

(54) PORTABLE INFORMATION TERMINAL

(75) Inventors: Shinya Haraguchi, Tokyo (JP); Akira Ogihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/804,519

(22) Filed: Mar. 12, 2001

(65) Prior Publication Data
US 2004/0027793 A1 Feb. 12, 2004

(30) Foreign Application Priority Data
Mar. 15, 2000 (JP) .................................. P2000-072327

(51) Int. Cl.$^7$ ................................................ G06F 1/16
(52) U.S. Cl. .................... 361/681; 361/683; 455/426.1; 345/156
(58) Field of Search ............................... 361/680–683; 348/220.1; 455/90, 522, 557, 569, 550, 566, 573; D14/137, 139, 377

(56) References Cited

U.S. PATENT DOCUMENTS

| | | | | |
|---|---|---|---|---|
| 5,594,619 A | * | 1/1997 | Miyagawa et al. | 361/681 |
| 6,020,878 A | * | 2/2000 | Robinson | 345/173 |
| 6,492,974 B1 | * | 12/2002 | Nobuchi et al. | 345/156 |
| 6,522,879 B2 | * | 2/2003 | Myer et al. | 455/426.1 |
| 6,549,789 B1 | * | 4/2003 | Kfoury | 455/550.1 |

* cited by examiner

Primary Examiner—Darren Schuberg
Assistant Examiner—Anthony Q. Edwards
(74) Attorney, Agent, or Firm—Jay H. Maioli

(57) ABSTRACT

In a portable information terminal, a display screen is provided on one surface of an upper half portion, and keys for inputting characters are provided at a surface of a lower half portion. The upper half portion can be pivoted to overlay the lower half portion. An operating unit for performing the control operation of the display content of the screen is provided at a portion of the lower half portion that is exposed even when the upper half portion overlays the lower half portion. A controller for controlling the display screen and other control processing is equipped in the lower half portion. The upper half portion and the lower half portion are rotatably joined to each other around a first rotational axis so as to be opened from the overlap state. The upper and lower half portions are also joined to each other so as to be rotatable around a second rotational axis perpendicular to the first rotational axis. A detector determines whether the display screen of the upper half portion faces the key-arranged surface of the lower half portion or whether the back side of the upper half portion faces the key-arranged surface side. In accordance with the detection result, the controller rotates the display image on the display screen by 180 degrees.

6 Claims, 10 Drawing Sheets

PORTABLE INFORMATION TERMINAL

BACKGROUND OF THE INVENTION

1. Field of the Invention

The present invention relates to a portable information terminal such as a pager, PDA (Personal Digital Assistant) or a cellular phone.

2. Description of the Related Art

Pagers which come into widespread use at present are designed to receive not only "personal messages" communicated between individuals, but also "information messages" such as information on news, weather forecast, etc. which are transmitted from the base station of the pagers. Further, each of these pagers is equipped with not only a function of selecting and displaying a message, but also various additional functions of setting a display time, selecting a call-reception notifying sound, etc.

Therefore, a conventional pager is designed in a compact size as shown in FIG. 12 to be equipped with a display screen 2 comprising a liquid crystal display or the like on the surface of a housing 1 of the pager, and also with a jog dial 3 as an operating unit for selecting a message or selecting an additional function.

The jog dial 3 functions as an up-down key by rotating a dial knob thereof, and also functions as a non-lock type enter key by pressing it in a radial direction. An escape key 4 provided to the knob portion of the jog dial 3 has a cancel function which means that the processing is returned to the stage just before the enter key is manipulated.

According to the pager shown in FIG. 12, an additional function selecting frame or a necessary message can be displayed on the display screen 2 by manipulating the jog dial 3 and the escape key 4. Accordingly, a very simple operating environment can be achieved and its operability is excellent.

Recently, a bi-directional pager which can send a transmission message has been supplied. This bi-directional pager needs a character input unit for inputting a transmission message and a display space for displaying the message input by the character input unit.

When the conventional pager as shown in FIG. 12 is designed to have the same function as the bi-directional pager, character input keys must be arranged on the same surface as the display screen 2 so as to positionally avoid the display screen 2.

However, when the pager itself is designed in small size and the character input keys are provided, the display screen 2 must be designed in very small size.

Further, since the space in which the character input keys are arranged is very small and the size of each character input key cannot be set to a very small value in consideration of the operability of the character input keys, it is difficult to mount a so-called full keyboard equipped with all the keys containing all alphabetical keys and all Hiragana characters.

There may be considered a method of successively displaying a character candidate to be input on the display screen by manipulating the jog dial 3 and determining the character to be input. However, a character selecting operation of selecting each desired character while successively displaying a character candidate is very cumbersome, and the operability is very bad particularly when a transmission message is created.

Therefore, a bi-directional pager having such a structure as shown in FIG. 13 has been proposed. According to the structure of this bi-directional pager, the housing of the pager is divided into an upper half portion 5 and a lower half portion 6 so that the upper half portion 5 can be opened around the rotational axis extending along a joint portion 7 between the upper and lower half portions as if a book is opened. In addition, a full keyboard 8 is provided on the lower half portion 6, and a display screen 9 of a liquid crystal display is provided on the upper half portion 5.

In the case of the pager having the structure shown in FIG. 13, it is required to carry out an opening work of upwardly lifting the upper half portion 5 around the hinge portion 7 with respect to the lower half portion 6 and then operate the full keyboard 8 not only when a transmission message is input, but also when a reception message is merely displayed on the display screen 9 or various additional functions are displayed and set on the display screen 9. Therefore, the excellent operability of a conventional receive-only pager as shown in FIG. 12 which is exclusively used for reception is lost.

SUMMARY OF THE INVENTION

The present invention has been implemented in view of the above circumstances, and has an object to provide a portable information terminal which is suitably used as a bi-directional pager with keeping the same level as the excellent operability of the receive-only pager.

In order to attain the above object, according to a first aspect of the present invention, there is provided a portable information terminal including: an upper half portion having a display screen comprising a display device at one surface side thereof; a lower half portion including an input key array of plural input keys arranged on one surface thereof and a controller which is provided in the lower half portion, analyzes an operating instruction input through the input keys and carries out the control processing corresponding to an analysis result to reflect the analysis result to the display content of the display screen; and a joint unit for joining the respective one end sides of the upper and lower half portions to each other so that the upper and lower half portions are rotatable around the joint unit and each of a surface of the upper half portion on which the display screen of the upper half portion is disposed (hereinafter referred to as "screen-arranged surface") and the opposite surface of the upper half portion to the screen-arranged surface can face a surface side of the lower half portion on which the plural input keys of the lower half portion are disposed (hereinafter referred to as "key-arranged surface").

According to a second aspect of the present invention, the portable information terminal according to the first aspect further includes a detector for detecting whether the rotational state of the upper half portion is a first state under which the display screen of the upper half portion faces the key-arranged surface side on which the plural input keys of the lower half portion are disposed or a second state under which the display screen of the upper half portion faces the opposite side to the key-arranged surface side when the upper half portion is rotated, wherein the controller of the lower half portion rotates display images on the display screen by 180 degrees according to the detection result by the detector.

In the case where the portable information terminal of the present invention is applied to the bi-directional pager as described above, when a transmission message is created, the portable information terminal is used while the upper half portion is rotated around the first rotational axis with respect to the lower half portion as shown in FIG. 2 from the initial state in which the key-arranged surface of the lower half portion is confronted to (overlapped with) the display-arranged surface of the upper half portion on which the display screen is disposed, thereby opening the portable information terminal.

Under this state, the input operation of a transmission message can be carried out by using input keys on a full keyboard or the like disposed at the lower half portion side.

In a normal using state that the bi-directional pager is used to display a reception message or display/set additional functions, the upper half portion is rotated around the second rotational axis with respect to the lower half portion by 180 degrees, and then overlaid on the lower half portion. Under this state, the using state of the portable information terminal is, as shown in FIG. 5 described later, perfectly identical to that of the conventional pager having the housing which is not divided into the upper half portion and the lower half portion as shown in FIG. 12.

By manipulating the operating portion provided at the side surface portion of the lower half portion, the selection of a reception message and the display/setting of additional functions can be carried out in the same manner as the conventional pager.

DETAILED DESCRIPTION OF THE PREFERRED EMBODIMENT

A preferred embodiment according to the present invention will be described hereunder with reference to the accompanying drawings.

In the following embodiment, the portable information terminal of the present invention is particularly applied to a bi-directional pager, however, it may be applied to other devices than the bi-directional pager.

Figure 1:
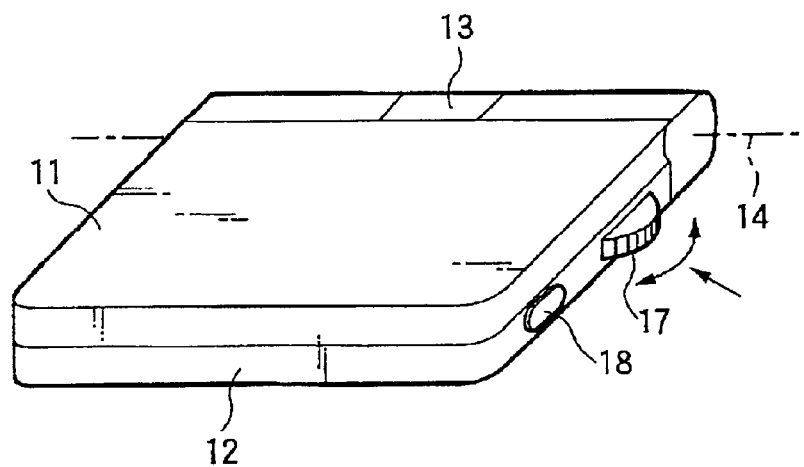
FIG. 1 is a perspective view showing a state of a portable information terminal according to an embodiment of the present invention.

FIG. 1 is a diagram showing the outlook of a pager according to an embodiment of the present invention.

The pager of this embodiment comprises an upper half portion 11 having a rectangular plate-like shape, and a lower half portion 12 having a rectangular plate-like shape which is designed substantially in the same size as the upper half portion 11. The upper half portion 11 and the lower half portion 12 are jointed to each other at respective one sides thereof through a joint portion 13 provided at the central portion of each of the sides of the upper and lower portions 11 and 12 so as to be rotatable around a first rotational axis (see one-dotted chain line 14 in FIG. 1) parallel to the one sides of the rectangles of the upper and lower portions 11 and 12.

A well known mechanism may be used as the mechanism for rotating the upper and lower half portions around the first rotating axis, and thus the detailed description of the mechanism will be omitted from the following description.

The first rotational axis shown by the one-dotted chain line 14 may be not only an actually-existing shaft rod or the like, but also a virtual rotational center in various rotational joint modes.

Figure 2:
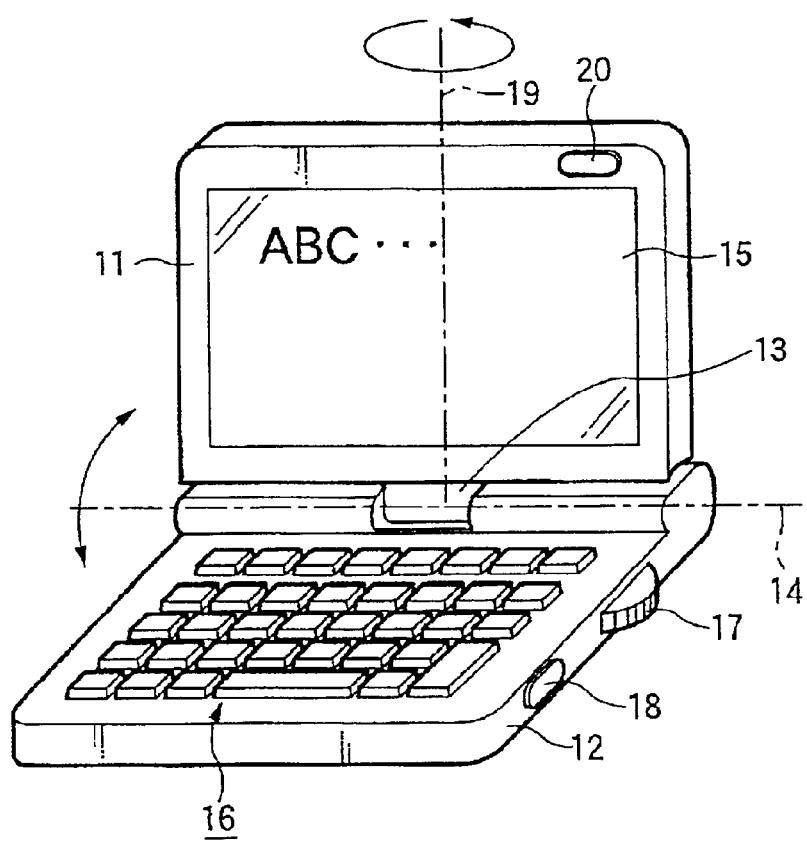
FIG. 2 is a perspective view showing another state of the portable information terminal according to the embodiment of the present invention.

Through the rotation around the first rotational axis at the joint portion 13, the portable information terminal can be opened as shown in FIG. 2 (i.e., the upper and lower half portions 11 and 12 are rotated around the first rotational axis so that the opposite sides thereof to the joint portion 13 are mutually separated from each other from the overlap state shown in FIG. 1).

A display screen 15 of a display device such as a liquid crystal display is disposed on one surface of the upper half portion 11 as shown in FIG. 2. In this case, the display screen 15 is designed as a relatively large-scale screen occupying substantially the whole one surface of the upper half portion 11.

Further, a keyboard portion 16 including plural input keys for inputting characters, etc. is disposed on one surface of the lower half portion 12 which faces the one surface side of the upper half portion 11, and a jog dial 17 and an escape key 18 serving as an operating unit for controlling the display content of the display screen are provided on one side surface of the lower half portion 12.

In the following description, the arrangement in which the screen-arranged surface of the upper lower portion faces the key-arranged surface of the lower portion means not only the arrangement (orientation) of the upper and lower half portions in which the display screen of the upper half portion is confronted to the keyboard of the lower half portion, but also an arrangement (orientation) of the upper and lower half portions in which the display screen of the upper half portion and the keyboard of the lower half portion would be finally confronted to (overlapped with) each other if the upper half portion is rotated around the first rotational axis to approach to the keyboard of the lower half portion. In other words, if the display screen of the upper half portion and the keyboard of the lower half portion can be finally overlapped with each other by continuing to rotate the upper half portion around the first rotational axis so as to close the portable information terminal even when the upper and lower half portions are first arranged on the same flat plane or the plane thereof is forwardly or backwardly bent, this first arrangement (orientation) will be referred to a screen/keyboard facing arrangement (state) in which the display screen of the upper half portion faces the keyboard of the lower half portion.

The jog dial 17 constitutes a key operating unit serving as various function keys such as an up-down key (a key for instructing the up-and-down direction of the screen 15), an enter key, etc. In this case, the jog dial 17 comprises a rotatable circular dial knob as shown in the outlook of the pager of FIG. 1.

The jog dial 17 serves as the up-down key as described later by rotating the dial knob, and also serves as a non-lock type press button by pressing the jog dial 17 in a radial direction. The function as the press button also serves as the enter key.

Press of the escape key 18 provides the opposite effect to that of the press of the jog dial 17 in the radial direction. That is, the escape key 18 serves as an input button key for returning the display content of the display screen to that just before the enter key is pressed.

Figure 3:
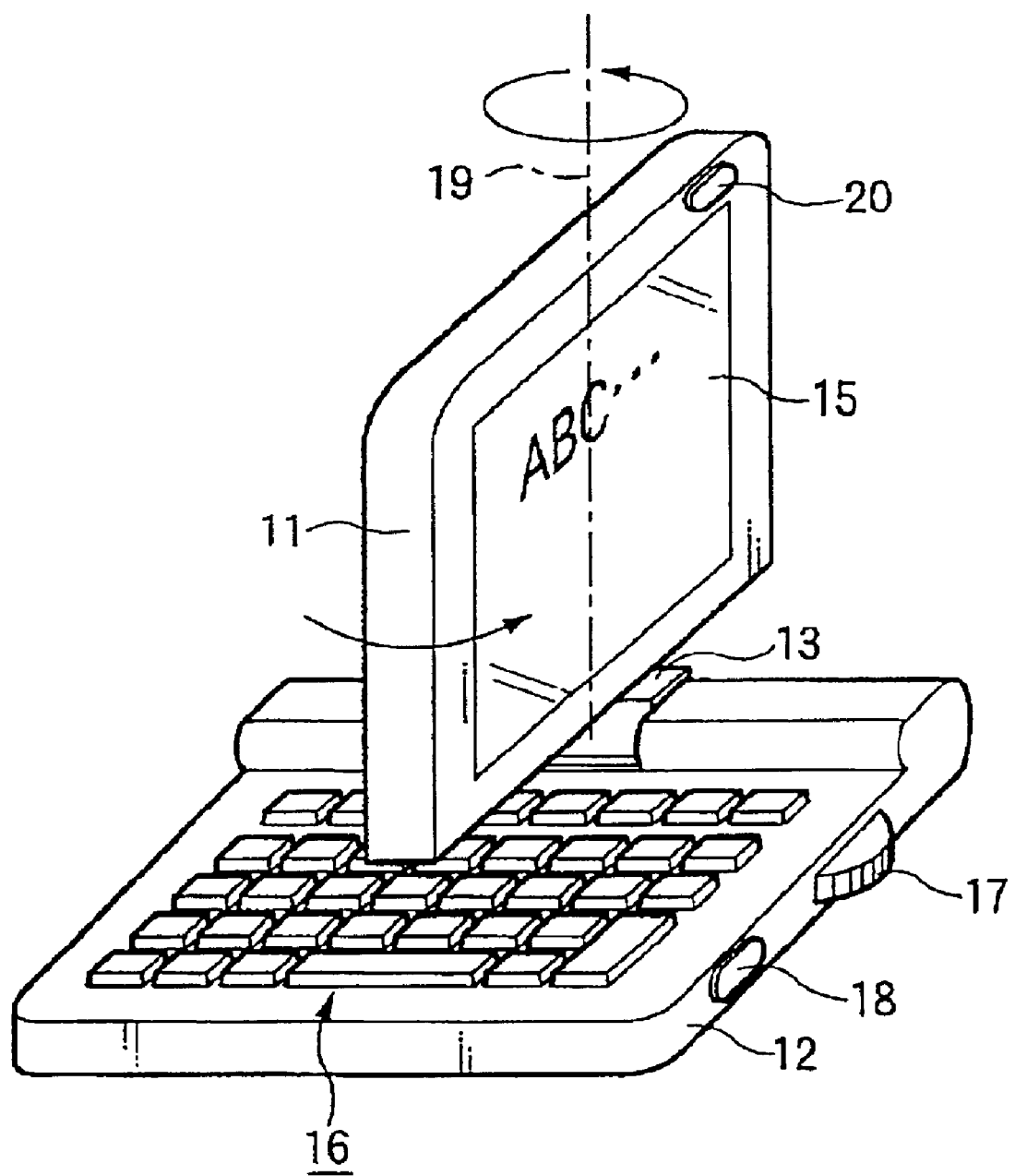
FIG. 3 is a perspective view showing another state of the portable information terminal of the embodiment of the present invention.

As shown in FIG. 3, the upper half portion 11 is also joined to the lower half portion 12 so as to be rotatable around a second rotational axis (one-dotted chain line 19 in FIGS. 2 and 3) perpendicular to the first rotational axis at the center portion in the first rotational axis direction (the direction of the one-dotted chain line 14), that is, the center portion of the joint portion 13.

A well known mechanism may be used as the mechanism for rotating the upper half portion 11 around the second rotational axis, and thus the detailed description thereof will be omitted.

As in the case of the first rotational axis, the second rotational axis shown by the one-dotted chain line 19 may be not only an actually-existing shaft rod or the like, but also a virtual rotational center in various rotational joint modes.

Figure 4:
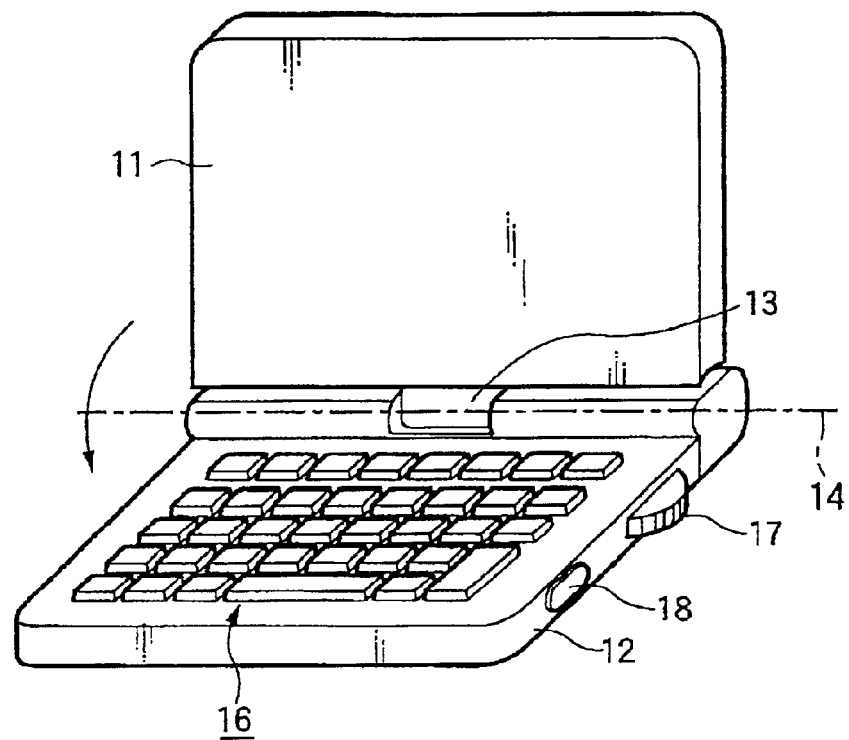
FIG. 4 is a perspective view showing another state of the portable information terminal of the embodiment of the present invention.

By rotation of the upper half portion 11 against the lower half portion 12 around the second rotational axis, as shown in FIG. 4, it is possible to face the display screen 15 of the upper half portion 11 opposite to the surface at which the keyboard portion 16 is provided, from the state shown in FIG. 2 through the state shown in FIG. 3.

Figure 5:
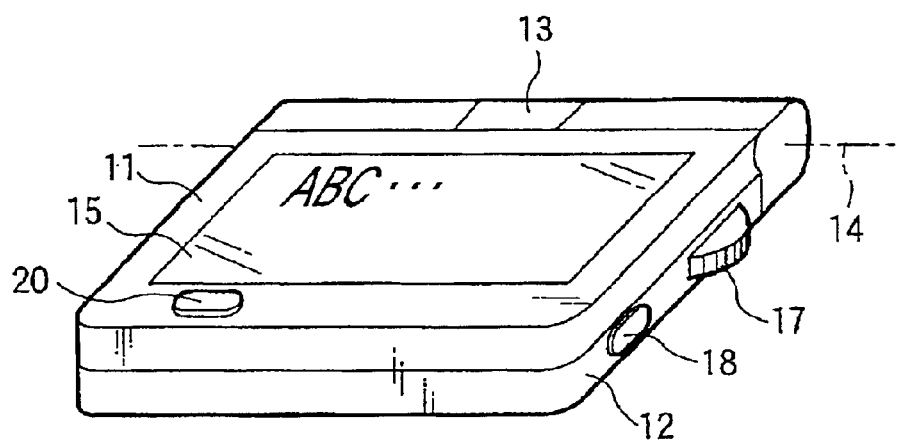
FIG. 5 is a perspective view showing another state of the portable information terminal of the embodiment of the present invention.
Figure 12:
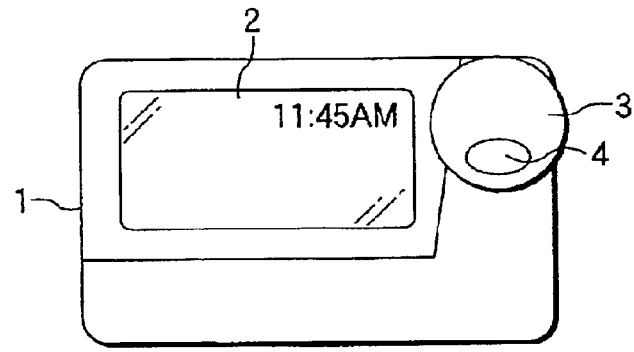
FIG. 12 is a diagram showing an outlook of a conventional receive-only pager.
Figure 13:
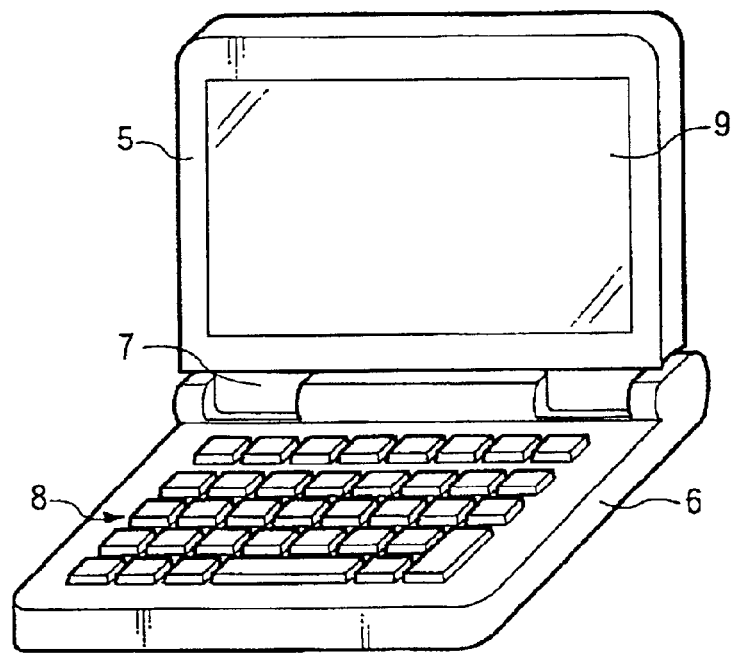
FIG. 13 is a diagram showing a use state of a conventional bi-directional pager.

By rotating the upper half portion 11 around the first rotational shaft from the state of FIG. 4 to overlay the upper half portion 11 on the lower half portion 12, the portable information terminal can be set to the state shown in FIG. 5. This state is the same as the using state of the conventional receive-only pager shown in FIG. 12.

In this embodiment, there is provided a screen-orientation detecting unit for discriminating the state that the screen-arranged surface of the upper half portion 11 faces the keyboard-arranged surface of the lower half portion 12 (i.e., the screen/keyboard facing arrangement), that is, the state that the user can view both of the display screen 15 of the upper half portion 11 and the keyboard portion 16 of the lower half portion 12 as shown in FIG. 2 from the state that the screen-arranged surface of the upper half portion 11 faces the opposite side to the key-arranged surface side of the lower half portion 12 (hereinafter referred to as "screen/keyboard inverse arrangement"), as shown in FIG. 4 or 5, that is, the state that the keyboard portion 16 of the lower half portion 12 is hidden by the upper half portion 11 and thus the user cannot view the keyboard portion 16 when the user faces the display screen 15 of the upper half portion 11 to read a received message.

In order to input a transmission message, it is necessary for the user to view both the display screen 15 of the upper half portion 11 and the keyboard portion 16 of the lower half portion 12, and thus the screen-orientation detecting unit may be designed to detect whether the current state (arrangement) is the screen/keyboard facing arrangement or the screen/keyboard inverse arrangement. Further, the detecting unit may be designed to detect not only the state shown in FIG. 2 in which the intersecting angle θ (in FIG. 2) between the screen-arranged surface and the key-arranged surface is lower than 180 degrees (i.e., the screen-arranged surface and the key-arranged surface are located to be forwardly bent), but also the state that the portable information terminal is further opened and thus the intersecting angle θ between the screen-arranged surface and the key-arranged surface is equal to 180 degrees (that is, the screen-arranged surface and the key-arranged surface are located on the same flat plane) or more angle (that is, the screen-arranged surface and the key-arranged surface are located to be backwardly bent).

The screen-orientation detecting unit may be constructed by disposing a detection switch element such as a photosensor or the like at a position displaced to the right or left from the second rotational axis shown by the one-dotted chain line 19 between the joint portion 13 and the upper half portion 11, for example.

For example, a light emission diode may be disposed at the left side of the center of the joint portion 13 so as to confront the upper half portion 11, for example. In addition, a photodetector is provided at the left side of the center of the joint portion 13 on the upper half portion 11 so as to confront the light emission diode when the upper half portion 11 is set to the state shown in FIG. 2. When the upper half portion 11 is set to the state shown in FIG. 2, the photodetector is not disposed at the right side of the center of the joint portion 13.

According to the construction as described above, when the display screen 15 of the upper half portion 11 is set to the state shown in FIG. 2 (i.e., the screen-arranged surface faces the keyboard portion 16 (the key-arranged surface)), the photodetector of the upper half portion 11 detects light from the light emission diode of the joint portion 13, and the photodetection output is set to high level. On the other hand, when the upper and lower half portions 11 and 12 are located in the screen/keyboard inverse arrangement (i.e., the display screen 15 of the upper half portion 11 faces the inverse surface to the key-arranged surface of the lower half portion 12 as shown in FIG. 4 or 5), the photodetector of the upper half portion 11 does not detect the light emitted from the light emission diode of the joint portion 13, and thus the photodetection output is set to low level.

Accordingly, by monitoring the level (high level or low level) of the photodetection output of the photodetector, it can be detected whether the display screen 15 of the upper half portion 11 faces the key-arranged surface of the lower half portion 12 or the inverse surface to the key-arranged surface.

The detection output of the screen-orientation detecting unit is transmitted to a controller equipped in the lower half portion 12, and the controller controls display images on the display screen 15 through its display control operation so that the display images are rotated by 180 degrees between the state (arrangement) of FIG. 2 and the state (arrangement) of FIG. 4 or 5.

In the above embodiment, a function key 20 for varying the function between when the state of FIG. 2 and the state of FIG. 5 is provided on the screen-arranged surface of the upper half portion 11 (on which the display screen 15 is arranged).

In this embodiment, the function key 20 serves as a delete key for deleting a character input through the keyboard portion 16 under the state of FIG. 2. Further, the function key 20 serves as a jump key for jumping to a specific function allocated to the function key 20 in a function menu having a hierarchical structure under the state of FIG. 5 as described later.

The switching operation of the function of the function key 20 is recognized by a controller described later on the basis of the detection output of the screen-orientation detecting unit.

The controller of the bi-directional pager of this embodiment and a circuit portion for performing a transmission/reception function and other needed functions are accommodated in the lower half portion 12. The construction of the circuit portion in the lower half portion 12 will be described while containing the connections between the circuit portion and peripheral parts such as the keyboard portion 16, the jog dial 17, etc. with reference to FIG. 6.

Figure 6:
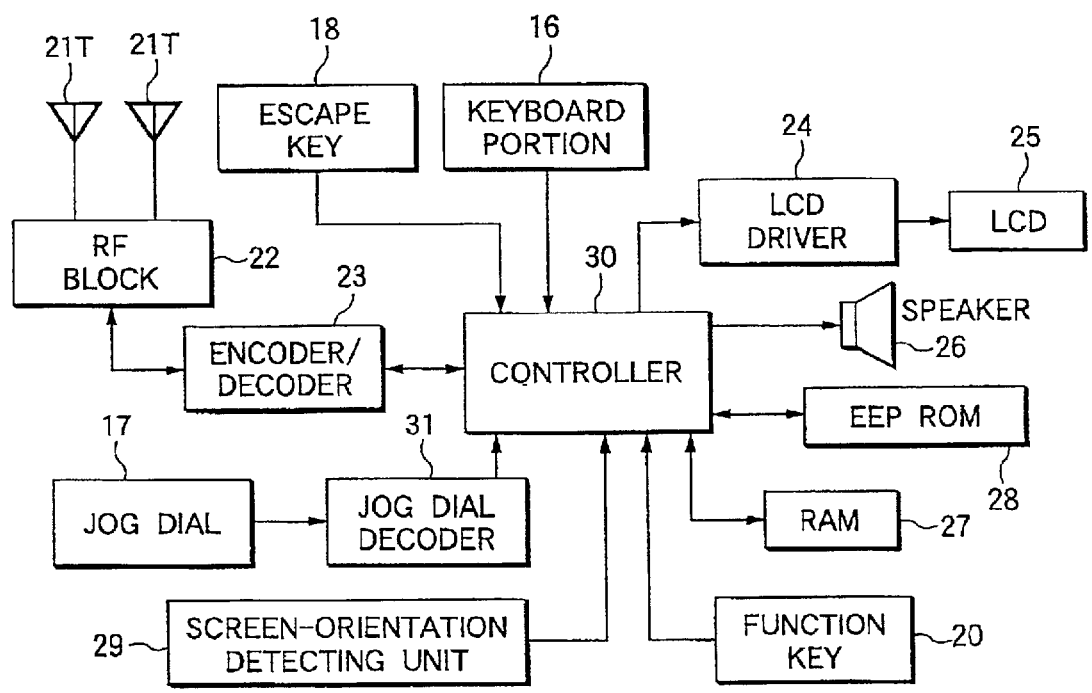
FIG. 6 is a block diagram showing the construction of the portable information terminal of the embodiment of the present invention.

As shown in FIG. 6, the pager of this embodiment includes a reception antenna 21R, a transmission antenna 21T, an RF block 22, an encoder/decoder 23, a keyboard portion 16, an LCD (Liquid Crystal Display) driver 24, LCD 25, a speaker 26, RAM 27, EEPROM 28, a controller 30, a jog dial 17, a jog dial decoder 31, an escape key 18, a function key 20 and a screen-orientation detecting unit 29.

The antenna 21R is used to receive data from a pager base station in a wireless (radio) mode. The antenna 21T is used to transmit data from a pager (source side) through the pager base station to a destination side. The RF block 22 carries out the processing such as amplification, etc. on the data received by the antenna 21R, etc., and supplies the data thus processed to the decoder 3. Further, it amplifies the transmission data to be transmitted through the transmission antenna 21T to the pager base station.

The encoder/decoder 23 decodes the reception data received by the RF block 22, and also modulates the transmission information transmitted from the controller 30. The encoder/decoder 23 transmits the decoded data to the controller 30, and also transmits the modulated transmission information to the RF block 22. The encoder/decoder 23 further controls the RF block 22.

The LCD driver 24 is a processor for displaying display information transmitted from the controller 30 on the screen 15 of LCD 25 under the control of the controller 30. When reception data such as a message or the like is received from the pager base station, the speaker 26 sounds a buzzer to notify the reception of the reception data. RAM 27 is a memory for storing the reception message, etc. EEPROM 28 is a memory for storing address information inherent to each equipment of the pager, etc.

The operation input of the jog dial 17 is detected by the jog dial decoder 31, and information indicating whether the operation input is the rotation of the dial knob or the press of the dial knob is transmitted from the jog dial decoder 31 to the controller 30. Further, the operation inputs of the keyboard portion 16, the escape key 18 and the function key 20 are also transmitted to the controller 30. The operation output of the function key 20 is also supplied to the controller 30.

The controller 30 comprises a microcomputer, for example. It analyzes the reception data from the encoder/decoder 23, creates a transmission message in accordance with a character input through the keyboard portion 16 and transmits the transmission message to the encoder/decoder 23, and receives the information of the operation input of the jog dial 17 from the jog dial decoder 31 and the operation input of the escape key 18 to analyze the information thus received and perform the processing corresponding to the analysis result.

The controller 30 carries out the storage processing on needed information in RAM 27, and transmits to the LCD driver 24 information for displaying a desired display image on the display screen 15 of LCD 25 (see FIG. 2).

Further, the detection output of the screen-orientation detecting unit 29 is supplied to the controller 30. The controller 30 detects on the basis of the detection output whether the current mode (arrangement) is a first mode in which the display screen 15 of the liquid crystal display 25 faces the keyboard portion 16 side of the lower half portion 12 (i.e., the screen/keyboard facing arrangement) or a second mode in which the display screen 15 of the liquid crystal display device 25 faces the inverse surface to the key-arranged surface of the lower half portion 12 (i.e., the screen/keyboard inverse arrangement). In accordance with the detection output, the controller 30 controls the display state on the display screen 15 so that the image displayed on the display screen 15 of the liquid crystal display 25 is rotated by 180 degrees between the first mode of FIG. 2 and the second mode of FIG. 5.

If the controller 30 identifies the first mode in which the display screen 15 of the liquid crystal display 25 faces the keyboard portion 16 of the lower half portion 12 (i.e., the screen/keyboard facing arrangement), the controller 30 permits the character input for a transmission message through the keyboard portion 16. Accordingly, when a character array is input through the keyboard portion 16, the controller 30 displays the character array on the display screen 15. That is, the first mode is a mode for allowing acceptance of the transmission message. At this time, the controller 30 recognizes the function key 20 as a delete key for the input characters and deletes the characters in accordance with the operation of the function key 20.

The transmission of the transmission message thus input can be carried out in the first mode. The respective reception functions based on the jog dial 17 and the escape key 18 are also available in the first mode.

On the other hand, if the controller 30 identifies the second mode in which the display screen 15 of the liquid crystal display 25 faces the inverse surface side to the keyboard portion 16 side of the lower half portion 12 (i.e., the screen/keyboard inverse arrangement), even when there is a character input from the keyboard portion 16, the controller 30 neglects the character input. That is, the character input of a transmission message is not accepted. In the second mode, the respective reception functions based on the jog dial 17 and the escape key 18 are available.

Further, in the second mode, the controller 30 recognizes the function key 20 as a jump key for jumping to a specific function, and when this function key 20 is manipulated, the controller 30 jumps to the function allocated to the function key 20.

The user can allocate any function to the function key 20 on the basis of the setting function of the jump function selected from a function menu, whereby a function which the user frequently uses, for example, reception of an information message such as the stock market or the like can be performed by merely operating the function key 20 even in a hierarchical structure menu as described later.

As described above, the controller 30 controls the entire pager. The controller 30 is implemented by a microcomputer.

The pager of this embodiment is designed to have two types of message folders for storing reception messages, that is, a message folder for storing personal messages and a message folder for storing information messages. These data are stored in RAM 27.

The personal message means a message to be communicated between individuals. The information message means information transmitted from a pager base station such as news, weather forecast, stock market, etc. For example, fifteen information messages are stored in RAM 27.

In this embodiment, characters, etc. of ten lines can be displayed on the display screen 15 of LCD 25, for example. When the data amount often lines is insufficient as information to be displayed like the above information message, the content of the display screen 15 may be displayed in a lap-around type scroll display mode by rotating the jog dial 17, for example.

Further, in this embodiment, various functions can be implemented on a small screen with excellent operability by the hierarchical structure menu.

Next, in order to simplify the drawings and the description, the operability of the jog dial 17 when a four-line display type hierarchical structure menu is provided will be described with reference to the flowcharts of FIGS. 7 to 9 and FIGS. 10 and 11 showing the display content in each state of the display screen 15. In this case, the rotating operation of the jog dial 17 corresponds to the up-down operation and the press operation corresponds to the enter operation as described above.

In the above embodiment, the pager has two message folders for storing the reception message, that is, the message folder for storing personal messages and the message folder for storing information messages, and has as the function menu ten menus of "POWER OFF", "SET NOTIFICATION", "MEMO", "ALARM CLOCK", "SELECT AUDIBLE ALERT", "DO NOT DISTURB", "SET TIME & DATE", "SCROLL MODE", "BANNER" and "FOLDER NAME".

Figure 7:
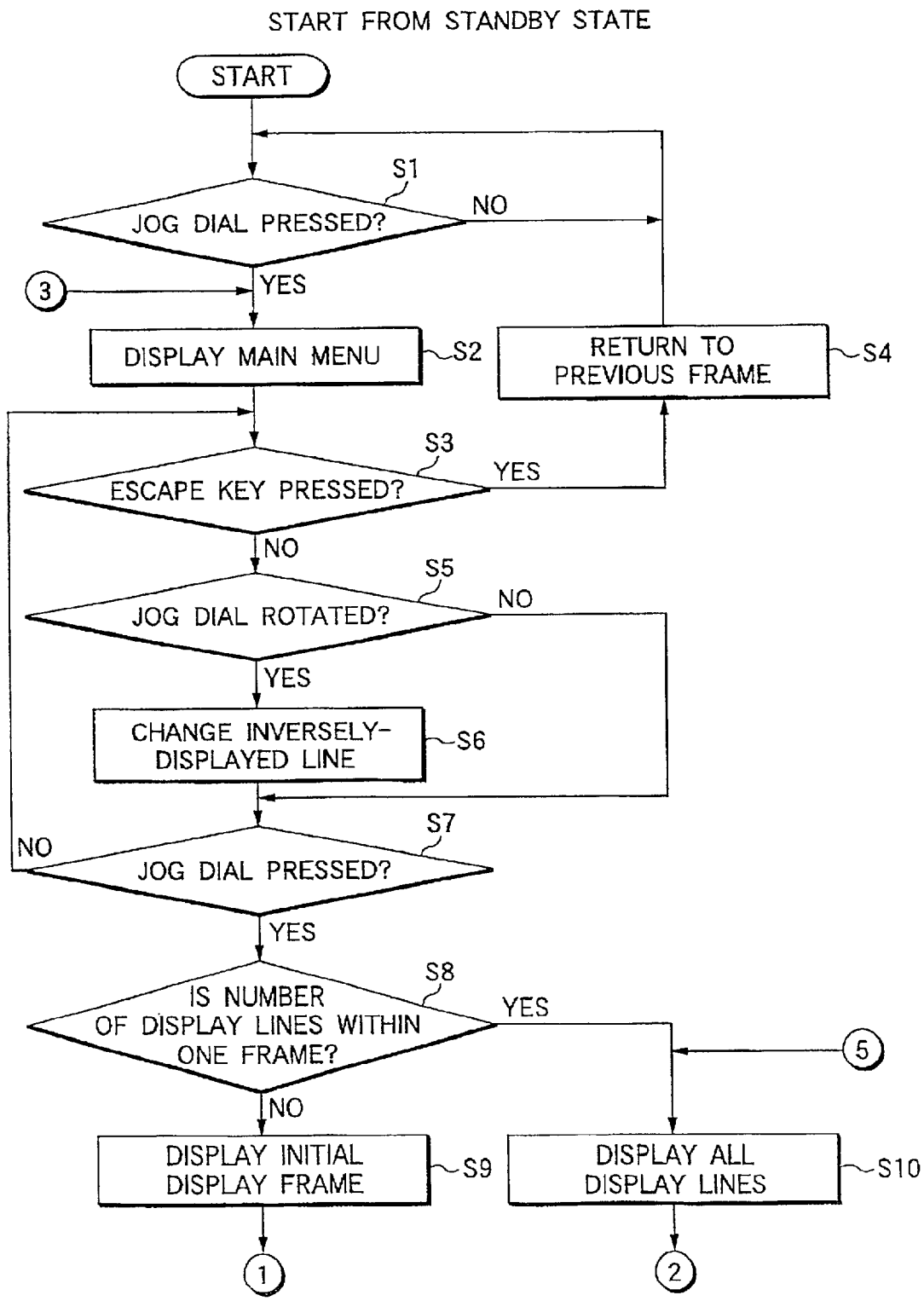
FIG. 7 is a part of a flowchart showing the operating and display processing of the portable information terminal of the embodiment of the present invention.

As shown in FIG. 7, when the jog dial 17 is pressed as the press button under a standby display state (step S1), a main menu is displayed on the display screen 15 (step S2). Subsequently, it is judged whether the escape key 18 is pressed or not (step S3). If it is judged that the escape key 18 is pressed, the display state is returned to the just-before display frame, that is, the standby display state (step S4). Thereafter, the processing returns to the step S1.

If it is judged in step S3 that the escape key 18 is not pressed, it is judged whether the jog dial 17 is rotated, that is, the up-down operation is carried out (step S5).

If it is judged that the jog dial 17 is rotated, an inverse-display line is changed (step S6). Here, the inverse-display line indicates the line being currently selected, and this line is displayed in an inverse mode to attract user's attention. As shown in a frame display described later, a selection target item is displayed on a line basis, and thus the inverse-display line indicates the selection target item being currently selected. The line which is displayed in the inverse mode is changed by rotating the jog dial 17.

Next, it is judged whether the jog dial 17 is pressed or not (step S7). If it is judged in step S5 that the jog dial 17 is not rotated, the processing also jumps to the step S7.

If it is judged in step S7 that the jog dial 17 is not pressed, the processing returns to the step S3, and repeats the line selecting step under the display state of the main menu. If it is judged in step S7 that the jog dial is pressed, the display content of the display screen 15 is changed to a selected menu item in a lower layer of the menu frame.

Subsequently, it is judged whether the number of menu items or messages displayed in a list style, that is, the display line number is within the total number of display lines on one frame (step S8). If it is within the total number on one frame, the processing goes to step S10 to display all the display lines of the menu items or messages in a lump on the display screen 15.

Thereafter, the following needed selection operation, etc. are carried out on the display frame. That is, the processing goes from the step S10 to step S21 of FIG. 9 to first judge whether the escape key 18 is pressed. If the escape key 18 is pressed, the display on the display screen 15 is returned to the display state of the main menu of the step S2 of FIG. 7.

If it is judged in step S21 that the escape key 18 is not pressed, it is judged whether the jog dial 17 is rotated (step S22).

If it is judged in step S22 that the jog dial 17 is not rotated, the processing jumps to step S24. If it is judged that the jog dial 17 is rotated, the inverse display line indicating the line being currently selected in lines displayed on the display screen 15 is changed (step S23). Thereafter, the processing goes to step S24 to judge whether the jog dial 17 is pressed.

If it is judged in step S24 that the jog dial 17 is not pressed, the processing returns to step S21. If it is judged in step S24 that the jog dial 17 is pressed, the processing goes to step S25 to change the display content of the display screen 15 to the lower-layer display content for the selected line and carry out the same display function as described above on the display frame of the lower layer.

Thereafter, it is judged in step S26 whether the escape key 18 is pressed. If the escape key 18 is pressed, the display on the display screen is returned to the display state of the layer just above the current layer of step S10 of FIG. 7. If it is judged in step S26 that the escape key 18 is not pressed, the processing returns to step S25 and the display function of the layer concerned is continued.

Figure 10A:
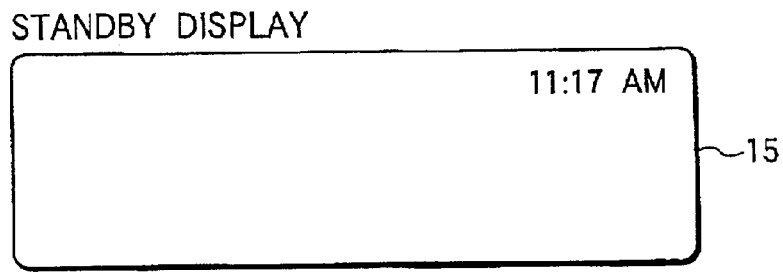
FIGS. 10A to 10E are diagrams showing modifications of the display content of the portable information terminal of the embodiment of the present invention.
Figure 10B:
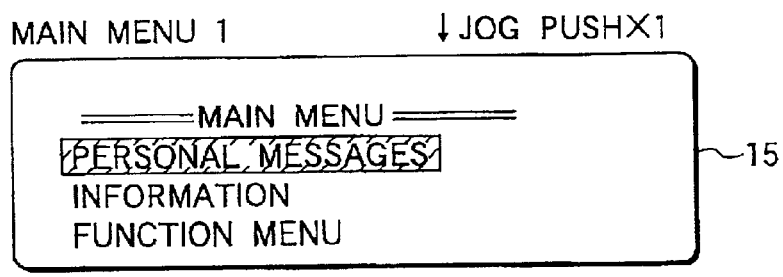
Figure 10C:
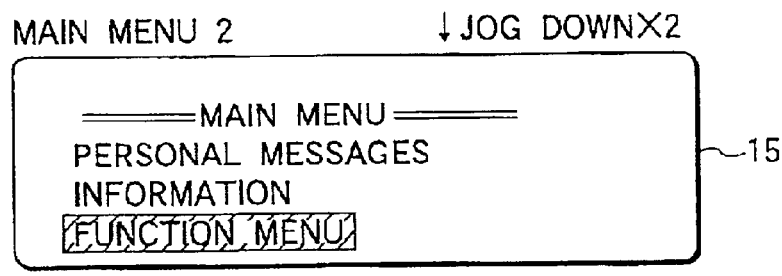
Figure 10D:
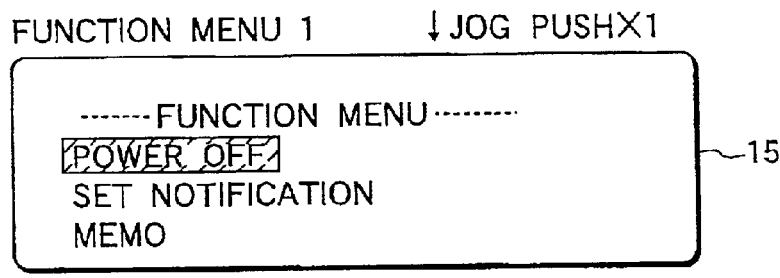

Subsequently, it is judged in step S8 of FIG. 7 that the number of lines to be displayed on the display screen 15 is beyond one display frame, the processing goes to step S9 to display an initial frame containing the head line in the selected function as shown in FIG. 10D.

Figure 8:
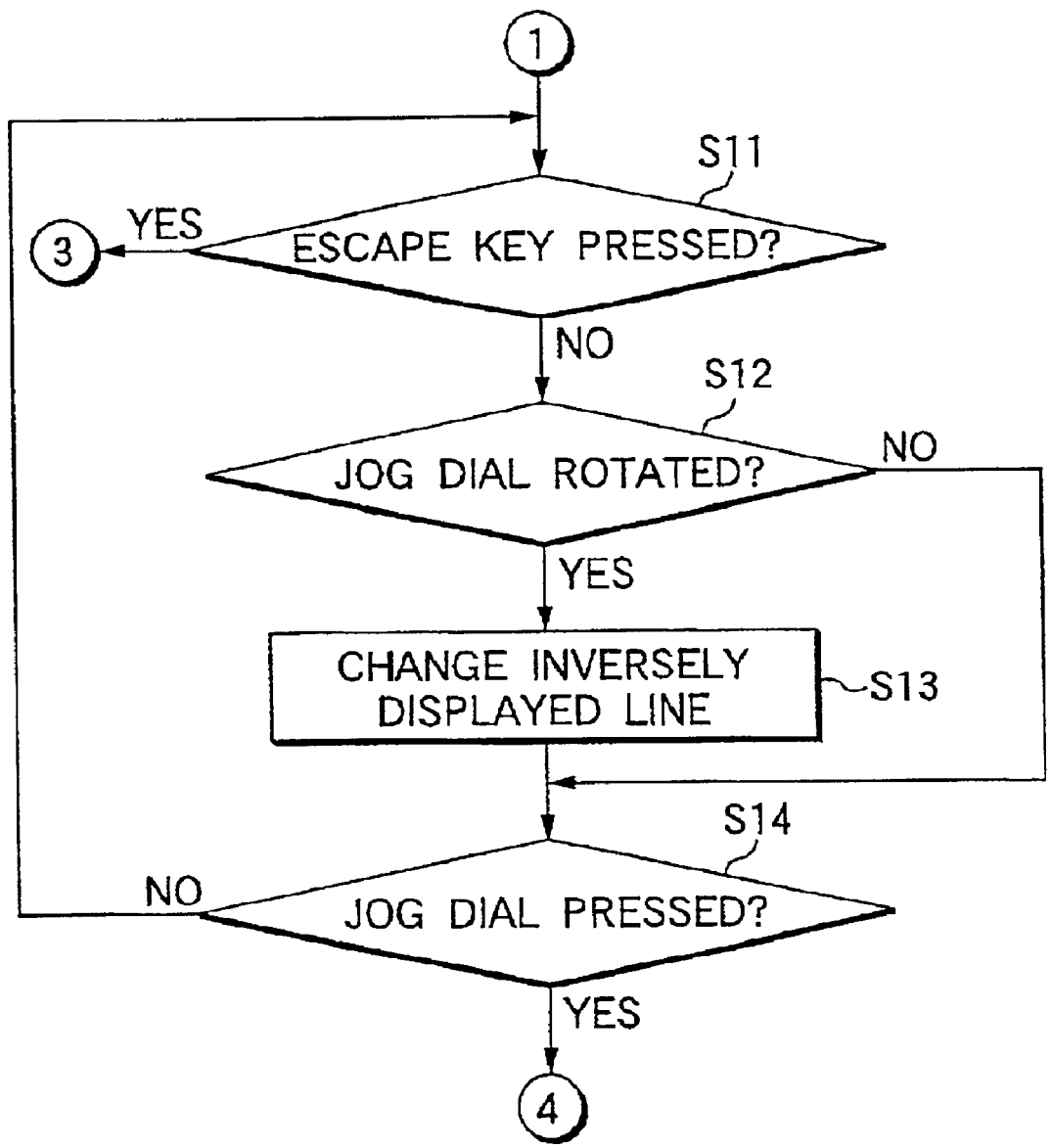
FIG. 8 is a part of the flowchart showing the operating and display processing of the portable information terminal of the embodiment of the present invention.
Figure 9:
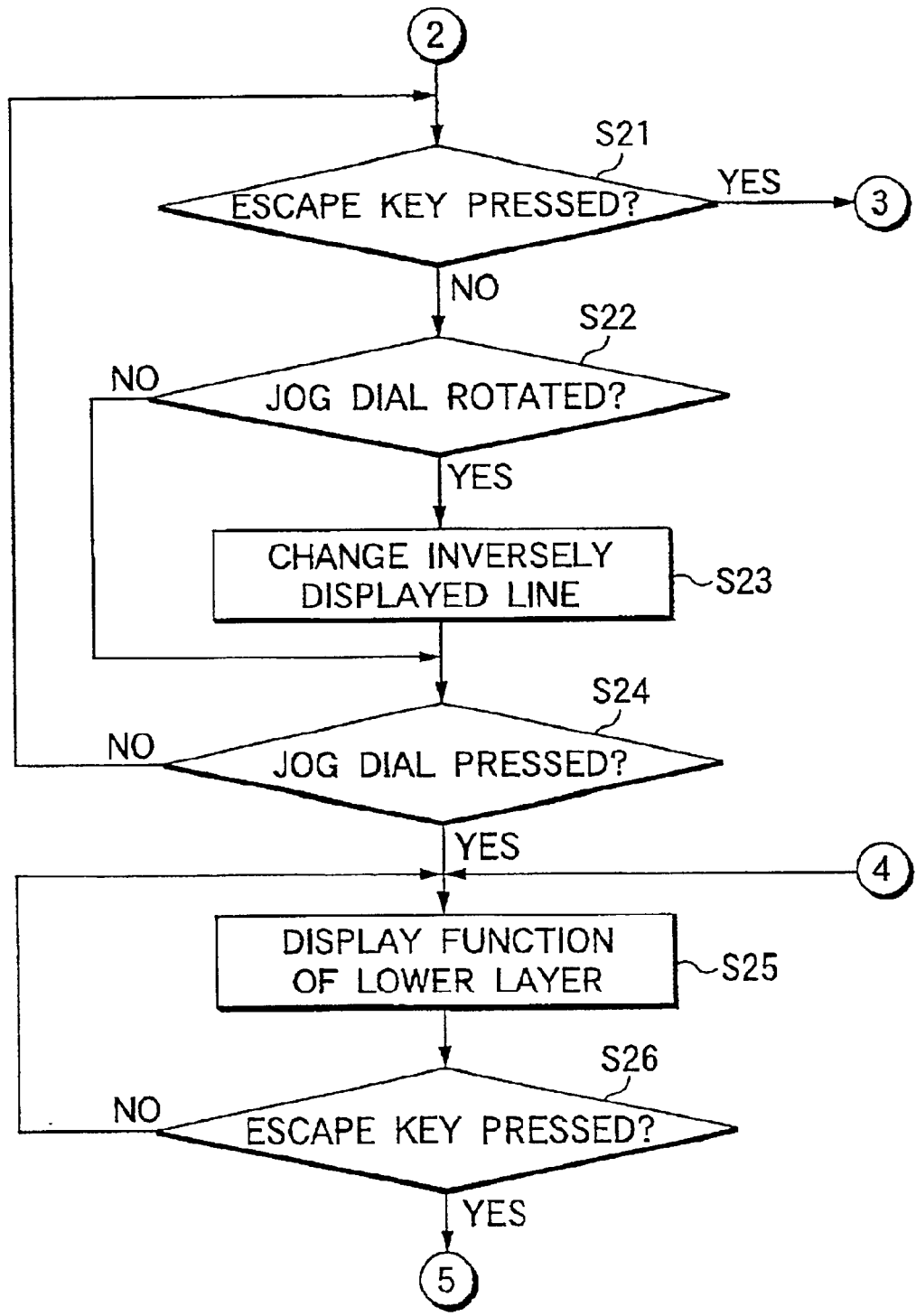
FIG. 9 is a part of the flowchart showing the operating and display processing of the portable information terminal of the embodiment of the present invention.

Subsequently, the processing goes to step S11 of FIG. 8 to judge whether the escape key 18 is pressed. If it is judged that the escape key 18 is pressed, the processing returns to step S2 of FIG. 7 to return the display content on the display screen to the display state of the main menu described above.

If it is judged in step S11 that the escape key 18 is not pressed, the processing goes to step S12 to judge whether the jog dial 17 is rotated. If it is judged that the jog dial 17 is rotated, the processing goes to step S13 to change the inversely-displayed line, and then it is judged in step S14 whether the jog dial 17 is pressed. If it is judged that the jog dial 17 is pressed, the processing goes to step S25 of FIG. 9 to shift to the display function frame of the just lower layer. On the other hand, if it is judged that the jog dial 17 is not pressed, the processing returns to step S11.

If it is judged in step S12 that the jog dial 17 is not rotated, the processing goes to step S14 to judge whether the jog dial 17 is pressed, that is, the currently inversely displayed line is selected and then it is judged whether it is determined that the display content of the lower layer corresponding to the line is displayed.

If it is judged in step S14 that the jog dial 17 is not pressed, the processing returns to step S11 to carry out the selection processing of the selection item as described above under the message list display state. If it is judged in step S14 that the jog dial 17 is pressed, the display state is shifted to the display frame on which the display content of the lower layer for the item corresponding to the selected line is displayed (step S25).

The variation of the display contents of the display screen 15 which correspond to the above operations and the display processing will be described with reference to FIGS. 10 and 11. In this case, there is shown the variation of the display content of the display screen 15 when the function menu is selected from the main menu and a scroll operation is carried out to search a specific function from the function menu.

FIG. 10A shows a standby display frame, and only time is displayed on the display screen 15. When the jog dial 17 is pressed from this standby display state, the main menu is displayed as shown in FIG. 10B.

In this case, since the main menu displays three menu items of a personal message, an information message and a function menu, all the menu items can be displayed on one display frame. On the first display frame, the personal message at the head line is displayed in the inverse mode (indicated by crosshatching) as shown in FIG. 6B.

When the jog dial 17 is rotated under this state, the inversely displayed line is changed. FIG. 10C shows the display state that the jog dial 17 is rotated downwardly, and thus the function menu located at the second lower line position from the top line is selected. When the jog dial 17 is pressed to carry out the enter operation under the state of FIG. 10C, the display content of the display screen 15 is changed to the initial display frame of the list frame of the function menu as shown in FIG. 10D.

Figure 10E:
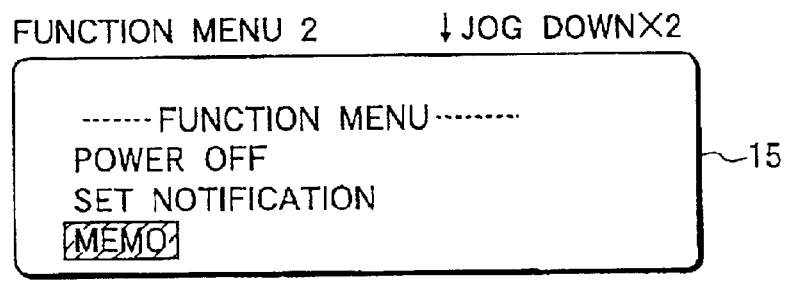

Subsequently, when the jog dial 17 is rotated, the item selected in the function menu is changed, and the inversely displayed line indicating the selected item is also changed. FIG. 10E shows the display state that the jog dial 17 is rotated downwardly and "MEMO" located at the second lower line from the top line is selected.

Figure 11F:
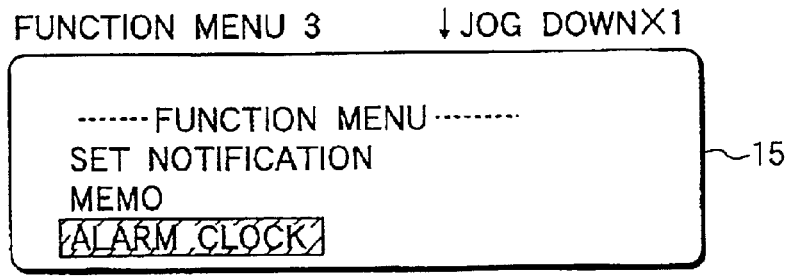
FIGS. 11F to 11J are diagrams showing modifications of the display content of the portable information terminal of the embodiment of the present invention.
Figure 11G:
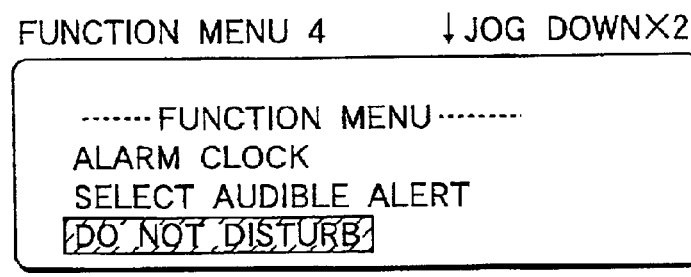
Figure 11H:
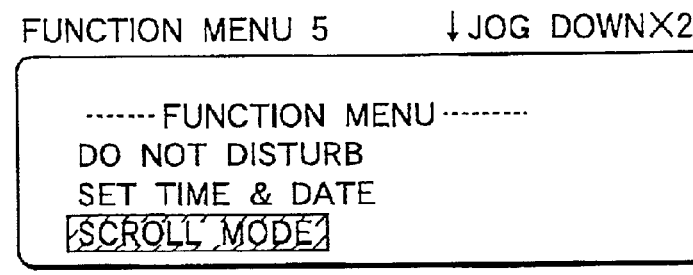

When the jog dial 17 is further rotated downwardly from the above state, the display frame content is scrolled and changed so that the line of "ALARM CLOCK" next to "MEMO" of the function item is displayed on the display screen 15 as shown in FIG. 11A. Subsequently, the content of the display screen 15 is successively changed through the scrolling of the function item as shown in FIGS. 11G, 11H and 11I by further rotating the jog dial 17 downwardly.

Figure 11I:
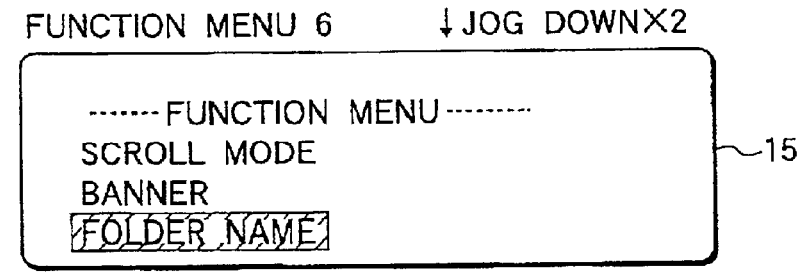
Figure 11J:
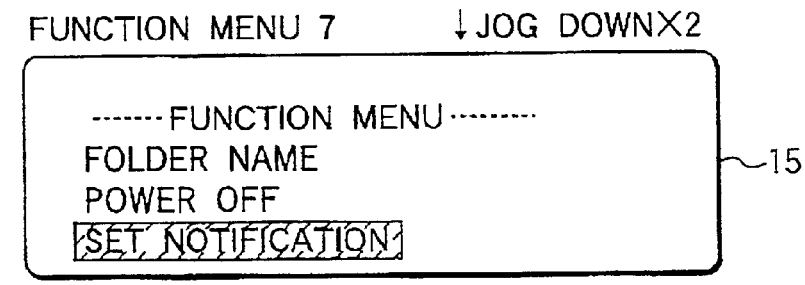

In this case, the display content at the fourth line of FIG. 11I is "FOLDER NAME" at the last line of the function item. When the jog dial 17 is further rotated downwardly from this state, the crosshatched portion is returned to the head line, and three lines of "FOLDER NAME" at the last line of the function menu item, "POWER OFF" at the head line of the function menu item and "SET NOTIFICATION" are displayed on the display screen 15 as shown in FIG. 11J.

Since the pager of this embodiment is constructed as described above, when the pager is used as a receive-only pager, the upper half portion 11 and the lower half portion 12 are overlapped with each other while the display screen 15 of the upper half portion 11 is orientated to the opposite side to the key-arranged surface side of the lower half portion 12 as shown in FIG. 5. Under this state, the same message display processing and function process as the conventional pager can be carried out by using the jog dial 17 and the escape key 18.

When a transmission message is input, the upper half portion 11 is opened with respect to the lower half portion 12 so that the display screen 15 faces the keyboard portion 16 (the key-arranged surface side) of the lower half portion 12 as shown in FIG. 2. Under this state, a transmission message is input by using plural character input keys of the keyboard portion 16 while displaying characters on the display screen 15.

Under the state of FIG. 2, the same message display processing and function processing can be also carried out by using the jog dial 17 and the escape key 18.

As described above, according to the pager of this embodiment, since the keyboard portion 16 is disposed on the lower half portion 12 which is provided separately from the upper half portion 11 on which the display screen 15 is provided, the display screen 15 of the upper half portion 11 can be designed in a relatively large size. Further, the overall one surface of the lower half portion 12 can be used for the space of the keyboard portion 16. Therefore, the each key of the keyboard portion 16 can be designed in a relatively large size, and thus the keyboard portion 16 can be constructed as a full keyboard. Accordingly, a character input environment bringing excellent operability can be achieved.

In addition, the pager of this embodiment can achieve the completely same using environment as the conventional receive-only pager under the using state of FIG. 5 that the upper half portion 11 is overlaid on the lower half portion 12, and thus the operability is very excellent.

Further, when the upper half portion 11 is rotated by 180 degrees to set the portable information terminal to the state of FIG. 5, the display screen 15 is controlled so that the display image on the display screen 15 is displayed while rotated by 180 degrees, and the jog dial 17 and the escape key 18 are provided at the side of the lower half portion 12. Therefore, even when the upper half portion 11 is rotated by 180 degrees, the position of each of the jog dial 17 and the escape key 18 is not varied under the state that the display content of the display screen 15 is rightly viewed, thereby making the operability of the portable information terminal excellent.

[Modification]

In the above embodiment, the second rotational axis around which the upper half portion 11 is rotated is arranged at the center portion of the joint portion 13. However, the arrangement of the second rotational axis of the present invention is not limited to the center position of the joint portion. For example, the second rotational axis may be arranged while slightly offset to the right or left side of the joint portion 13.

Further, when the upper half portion 11 is rotated around the second rotational axis, a stopper mechanism for allowing the upper half portion 11 to rotate from the state of FIG. 2 by 180 degrees, but prohibit the upper half portion 11 to further rotate over 180 degrees may be provided. Besides, the upper half portion 11 may be designed to be rotatable in both the clockwise and counterclockwise directions.

A ball joint may be used as the joint unit for joining the upper and lower half portions 11 and 12 so that the first and second rotational axes are not limited to unique ones and they can freely rotate in any direction.

In the above embodiment, the optical devices (light emission diode and photodetector) are used as the screen-orientation detecting unit. However, in place of the arrangement of the optical devices, a non-lock type press button provided at the left side of the center of the joint portion 13 and a notched portion which is formed on the upper half portion 11 so as to confront the press button in FIG. 2 may be arranged. With this arrangement, under the state of FIG. 2, the press button is inserted into the notched portion to keep the switch to the OFF state. Under the state of FIGS. 4 and 5, the press button is pressed by the upper half portion 11 to set the switch to the ON state, whereby the press button and the notched portion serve as the screen-orientation detecting unit. Of course, the locations of the optical devices and the press button may be exchanged between the upper half portion 11 and the joint portion 13.

Likewise, in place of the press button, electrical connection points may be provided to the upper half portion 11 and the joint portion 13 so that the connection points are closed to each other under the state of FIG. 2 or the state of FIGS. 4 and 5, and the connection points are opened when the upper half portion 11 faces the opposite side.

Still further, in the above embodiment, the pager of the present invention is controlled to function as a receive-only pager in accordance with the output of the screen-orientation detecting unit. However, it may be controlled to serve as a receive-only pager by detecting the state that the upper and lower half portions 11 and 12 are overlapped with each other as shown in FIG. 5. Specifically, for example, a set of optical devices (light emission diode and photodetector) are juxtaposed at the upper left side of the keyboard portion 16 of the lower half portion 12 in the state of FIG. 4, and a small mirror or reflection sheet is attached to the confronting portion of the upper half portion 11 to the optical devices (at the lower right portion in FIG. 4). In this case, under the state of FIG. 5, light emitted from the light emission diode is intensively reflected from the mirror or reflection sheet and enters the photodetector, whereby this arrangement (mechanism) functions as the overlap detecting unit for the upper and lower half portions 11 and 12 to identify the positional relationship between the upper and lower half portions. Of course, the operating mode may be determined on the basis of both of the output of the screen-orientation detecting unit and the output of the overlap detecting unit.

In the above embodiment, the up/down instruction is made by using the jog dial 17, and the instruction of "enter" is also carried out by using the jog dial 17. However, the same operation and effect could be achieved by providing keys such as a select key, an enter key, an up/down key, etc. to the side surface of the lower half portion 12.

In the above embodiments, the present invention is applied to the pager. However, the present invention is not limited to the pager, but may be applied to all portable information terminals each having a display screen.

As described above, according to the present invention, the display screen is disposed to face the user side at all times so that desired processing operations are carried out while the upper half portion and the lower half portion are overlapped with each other. In addition, under the state that the upper half portion and the lower half portion are opened from each other, the character input operation can be carried out while characters input through plural character input keys are displayed on the display screen, and thus the portable information terminal having very excellent operability can be implemented.

Accordingly, there can be provided a portable information terminal suitably used as a bi-directional pager which does not lose the operability of a receive-only pager.

What is claimed is:

1. A portable information terminal including:

an upper half portion having a screen-arranged surface and a back surface, wherein a display screen of a display device is disposed at said screen-arranged surface;

a lower half portion including an input key array of a plurality of input keys arranged on a key-arranged surface thereof and a controller provided in said lower half portion, said controller analyzes an operating instruction input through said input keys and carries out the control processing corresponding to an analysis result to reflect the analysis result to the display content of said display screen;

a joint unit for joining the respective one end sides of said upper and lower half portions to each other so that said upper and lower half portions are rotatable around a first rotational axis so that in a first state said screen-arranged surface of said upper half portion on which said display screen is disposed can face and overlay said key-arranged surface side of said lower half portion on which said plural input keys are disposed, and so that said upper half portion is rotatable around a second rotational axis perpendicular to the first rotational axis at the joint portion between said upper half portion and said lower half portion, whereby in a second state said back surface of said upper half portion can face and overlay said key-arranged surface of said lower half portion;

a detection unit for detecting whether said portable information terminal is in said first state in which said display screen of said upper half portion faces the key-arranged surface side of said lower half portion or in said second state in which said back surface of said upper half portion faces the key-arranged surface side, wherein said controller controls the control processing in accordance with the detection result supplied from said detecting unit;

a radio transmission/reception unit for transmitting/receiving a message in a wireless mode;

and an operating unit for carrying out the control operation of the display content of said display screen, wherein under the second state in which the key-arranged surface of said lower half portion and the back side of the upper half portion are overlapped with each other and said display screen of said upper half portion is exposed to the outside, only the display operation of the received message onto said display screen is carried out by using only said operating unit.

2. The portable information terminal as claimed in claim 1, wherein said controller controls the display content of said display screen in accordance with the detection result supplied from said detecting unit, so that an image on said display screen is rotated by 180 degrees.

3. The portable information terminal as claimed in claim 1, further comprising an operating unit for carrying, out the control operation of the display content of said display screen, wherein said operating unit is provided to said upper half portion and/or said lower half portion so as to be exposed to the outside when said upper half portion overlays said lower half portion, and said controller analyzes an operating instruction input through said input keys or said operating unit to perform the control processing corresponding to the analysis result and reflect the control processing result to the display content of said display screen.

4. The portable information terminal as claimed in claim 1 further including a radio transmission/reception unit for transmitting/receiving a message in a wireless mode, wherein a message to be transmitted is written onto said display screen by using said plurality of input keys only when the screen-arranged surface of said upper half portion and the key-arranged surface of the lower half portion can be visually recognized by a user who writes the message.

5. The portable information terminal as claimed in claim 1, further comprising a radio transmission/reception unit for transmitting/receiving a message in a radio mode, wherein under said second state that the back surface of said upper half portion faces the key-arranged surface side of said lower half portion, said controller neglects a character input based on one of said plurality of input keys.

6. The portable information terminal as claimed in claim 1, further comprising a key operating unit which is functionally varied between said first state and said second state.

* * * * *